United States Patent [19]

Paulat et al.

[11] Patent Number: 5,083,243
[45] Date of Patent: Jan. 21, 1992

[54] LAMP FOR MOTOR VEHICLES INCLUDING FOG WARNING OR BACKUP LAMP

[75] Inventors: Annerose Paulat, Bietigheim-Bissingen; Hans-Joachim Wirth, Oberstenfeld, both of Fed. Rep. of Germany

[73] Assignee: SWF Auto-Electric GmbH, Bietigheim-Bissingen, Fed. Rep. of Germany

[21] Appl. No.: 572,970
[22] PCT Filed: Nov. 25, 1989
[86] PCT No.: PCT/EP89/01430
§ 371 Date: Aug. 7, 1990
§ 102(e) Date: Aug. 7, 1990
[87] PCT Pub. No.: WO90/06246
PCT Pub. Date: Jun. 14, 1990

[30] Foreign Application Priority Data

Dec. 9, 1988 [DE] Fed. Rep. of Germany ....... 3841501

[51] Int. Cl.$^5$ .............................................. B60Q 1/26
[52] U.S. Cl. ..................................... 362/61; 362/247; 362/300
[58] Field of Search ...................... 362/61, 80, 83, 235, 362/247, 298, 299, 300, 346

[56] References Cited

U.S. PATENT DOCUMENTS

| | | | |
|---|---|---|---|
| 1,205,916 | 11/1916 | Meador | 362/258 |
| 1,525,234 | 2/1925 | Graham | 362/298 |
| 1,561,078 | 11/1925 | Hocks | 362/298 |
| 1,610,105 | 12/1926 | Moise | 362/298 |
| 1,694,485 | 12/1928 | Newland et al. | 362/298 |
| 1,740,507 | 12/1929 | Haas | 362/298 |
| 1,748,057 | 2/1930 | Arbuckle | 362/298 |
| 1,883,466 | 9/1928 | Bamford | |
| 2,993,987 | 7/1961 | Diffie | |
| 4,636,923 | 1/1987 | Oyama et al. | 362/298 |
| 4,755,916 | 7/1988 | Collins | 362/298 |
| 4,794,501 | 12/1988 | Bartenbach | |

FOREIGN PATENT DOCUMENTS

| | | |
|---|---|---|
| 647133 | 6/1937 | Fed. Rep. of Germany . |
| 1021255 | 9/1954 | Fed. Rep. of Germany . |
| 1068811 | 4/1958 | Fed. Rep. of Germany . |
| 2502293 | 9/1982 | France . |

Primary Examiner—Ira S. Lazarus
Assistant Examiner—Richard R. Cole
Attorney, Agent, or Firm—Robert P. Seitter; J. Gordon Lewis

[57] ABSTRACT

A lamp for motor vehicles including a fog warning or backup lamp. The lamp comprises a lamp compartment which is covered by a transparent cover glass towards the front portion. A bulb projects into the lamp compartment from the back and a parabolic reflector diverts light from the bulb onto the cover glass. High light values are obtained even in the case of a small light transmitting surface at the front of the lamp compartment. This is achieved in that the cross-section of the lamp compartment is larger than the light transmitting surface at the front of the lamp compartment and that the bulb is partly surrounded by a ball reflector which is located outside the light transmitting surface. The center of the ball reflector is at least approximately identical with the filament of the bulb and the ball reflector casts light form the bulb onto the parabolic reflector.

6 Claims, 1 Drawing Sheet

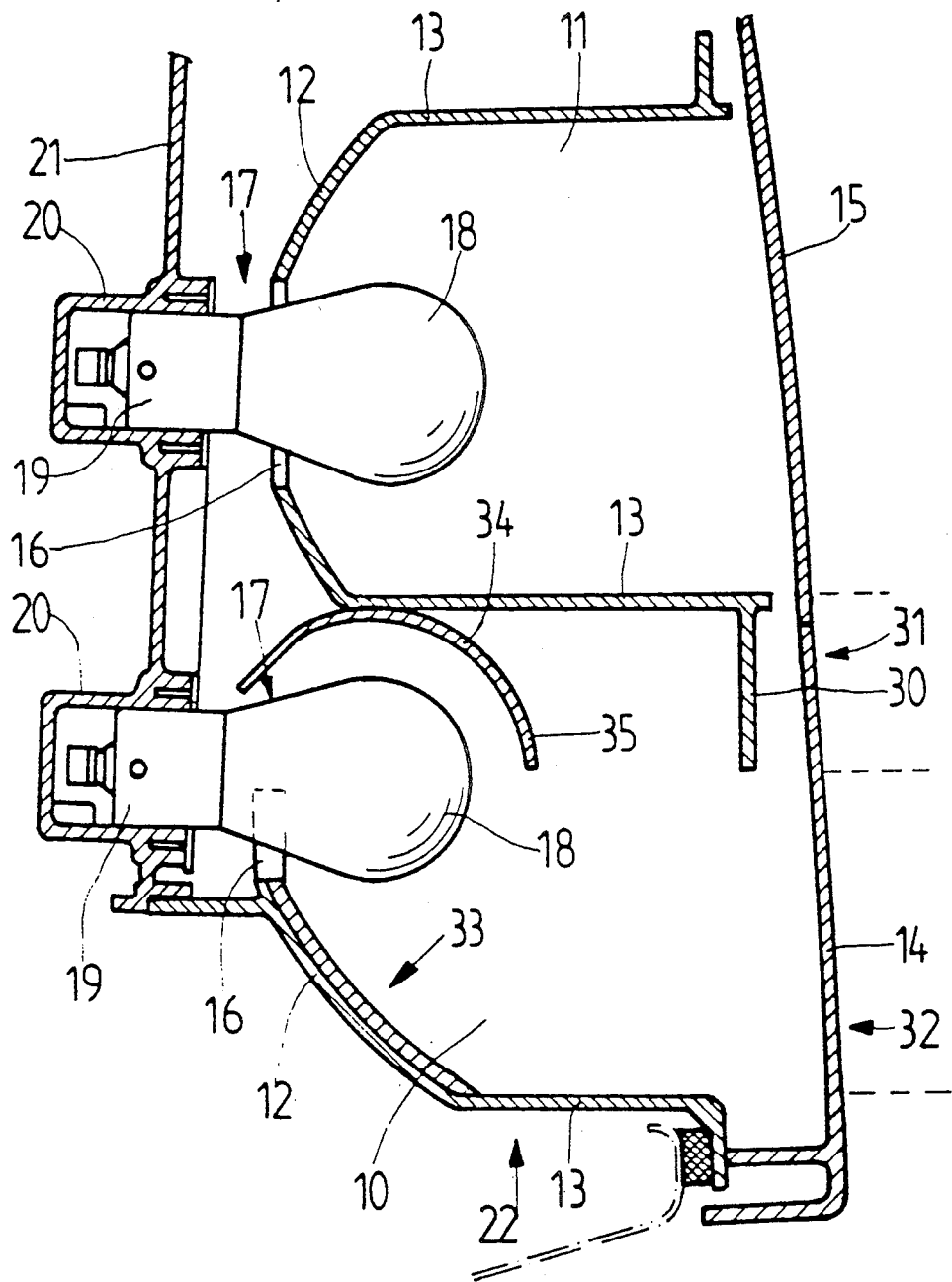

LAMP FOR MOTOR VEHICLES INCLUDING FOG WARNING OR BACKUP LAMP

BACKGROUND OF THE INVENTION

The present invention relates to a lamp for motor vehicles including a fog warning or backup lamp. With regard to fog warning or backup lamps it is important that for achieving the necessary light values the light from a bulb projecting into a lamp compartment is optimumly utilized. Therefore known fog warning and backup lamps include a parabolic reflector at the back of the lamp compartment, which parabolic reflector diverts the light which is directed to the side as well as that which is partially directed backwardly to a transparent cover glass at the front of the lamp compartment. Thus, not only the rays directly cast onto the cover glass by the bulb but also the indirectly cast rays pass out through the cover glass.

In certain applications the surface through which light from the lamp compartment passes outside must be kept relatively small. The manufacturer of motor vehicles may require this for reasons of design. In lamps for motor vehicles with several compartments, in which lamps a plurality of functions, including, for example, a fog warning lamp, a backup lamp, a turn-signal lamp and rear and stop lamp is combined, the light transmitting surface of the fog warning or backup lamp, is provided at a predetermined distance of the light transmitting surfaces assigned to the other functions so that when the fog warning or the backup lamp is switched on, a signal passing an adjacent light transmitting surface is still clearly distinguishable. Thus, at the front of the lamp for motor vehicles there is a portion that cannot be used for the transmission of light, and the lamp for motor vehicles cannot exceed a certain size. This then results in a small light transmitting surface for a particular signalling function.

It is therefore an object of the present invention to develop a lamp for motor vehicles with the noted features such that even with a small light transmitting surface, the necessary light values are nevertheless achieved.

SUMMARY OF THE INVENTION

This object is achieved according to the present invention by means of a lamp for multi lamp compartment installations for motor vehicles, with one lamp compartment provided with features particularly for fog or back up lamps, allowing distinction between that lamp and an adjacent lamp. In the one compartment, the cross-section of the lamp compartment is larger than the light transmitting surface at the front of the lamp copartment and the bulb is partly surrounded by a partially spherical ball reflector, the center of which is at least approximately identical with the filament of the bulb and which ball reflector casts light from the bulb onto the parabolic reflector.

Thus in a lamp for motor vehicles according to the present invention a portion of the lamp compartment positioned outside the light transmitting surface at the front portion thereof is also used in a light utilization manner. A ball reflector located therein, casts light back to itself so that it impinges on the parabolic reflector as if it were from the filament. This light otherwise would be absorbed or reflected by a side wall of the lamp compartment and could not be utilized. By using this portion of light the necessary light values, especially very high light values for fog warning lamp can be achieved even when the light transmitting surface is small.

In one embodiment the parabolic reflector is located substantially only on one side of a plane running through the axis of the bulb. In a preferred embodiment the ball reflector is larger than a portion from which light from the bulb is cast onto the parabolic reflector. This then simplifies the production of the ball reflector. Additionally, the reflector can simultaneously be used as the light blocking means for the portion at the front of the lamp compartment, which portion is not illuminated. In the space between the bulb and the front of the lamp compartment the ball reflector extends beyond a portion from which light is cast onto the parabolic reflector. In particular, in the space between the bulb and the front of the lamp compartment the ball reflector can extend at least approximately up to a plane running through the axis of the bulb.

It is advantageous that the front of the lamp compartment is partly covered by a panel, which is provided in addition to the ball reflector. Such a panel ensures that light directly transmitted from the bulb and not interrupted by the ball reflector does not illuminate the front of the lamp compartment in that portion which is not a light transmitting surface. Even if, however, the ball reflector cuts out the rays from the bulb which would directly strike this portion of the front of the lamp compartment, such a panel in addition to the ball reflector is of an advantage because it prevents diffused light cast onto the dark portion at the front of the lamp compartment because of the closeness of the ball reflector to the bulb from illuminating this portion. Advantageously, the cover glass also spans across the panel.

As presently utilized, lamps with several compartments are used as rear lamps for motor vehicles. In these lamps a compartment is assigned to one or more signalling functions. In such a lamp comprising two adjacent lamp compartments, the portion of the front of the one lamp compartment which is protected against the light from the bulb by means of the ball reflector, and/or of the panel in addition thereto, can be arranged in the front of the other lamp compartment. Thus, the light transmitting surfaces of two lamp compartments are clearly separated so that signals can be realized even when the lamps are emanated or on at the same time. Typically the lamp compartment assigned to the fog warning lamp includes the protected portion at its front portion.

According to a preferred embodiment of the present invention, the cross-section of the lamp compartment is larger than the light transmitting surface at the front of the lamp compartment. The glass of the bulb is at least partly located in the portion in the lamp compartment outside the light transmitting surface. The portion behind the light transmitting surface the back of the lamp compartment is formed by a parabolic reflector. Due to this position of the bulb the parabolic reflector can be of a very large size and divert a large portion of the light from a bulb onto the light transmitting surface. Thereby luminous efficiency, even without ball reflector, is sufficiently high so that a lamp for motor vehicles comprising the features of a preferred embodiment of the present invention can advantageously be used even without a ball reflector.

BRIEF DESCRIPTION OF THE DRAWING

An embodiment of a lamp for motor vehicles according to the present invention which comprises two adjacent lamp compartments is illustrated in the drawing the single figure of which illustrates a section taken through the two lamp compartments.

DETAILED DESCRIPTION

The lamp with several compartments comprises a compartment 10 assigned to a fog warning lamp, and a compartment 11, assigned to the turn-signal lamp for indicating the direction and the hazard-warning-signal. The compartments 10 and 11 have a back 12 and side walls 13, one side wall of which the two compartments share in common. The front of the one lamp compartment 10 is converted by a red transparent cover glass 14 and the lamp compartment 11 is covered by a yellow transparent cover glass 15. A glass 18 of the bulb 17 projects into each compartment through apertures 16 at the back sides 12. By means of the base 19, the bulbs 17 are located in sockets 20 of a lamp holder 21, which holder is detachably fastened to the lamp housing 22 forming the lamp compartments behind the back sides 12.

The cover glass 14 of the lamp compartment 10 is backed by light blocking means here comprised of an opaque panel 30 extending from the side wall 13 which the two lamp compartments 10 and 11 share in common. The panel 30 extends from the joint or common side wall approximately more than a third of the distance up to the opposite side wall 13. Thus, at the front of the lamp compartment 10, a certain portion 31 following the lamp compartment 11 is not illuminated to define a light transmitting surface 32 on the side remote from the adjacent light compartment. Therefore, a turn-signal can well be provided and utilized even when the fog warning lamp is on.

As described hereinabove, the cross-section of the lamp compartment 10 is larger than the light transmitting surface at the front of the lamp compartment. The bulb 17 is not centrally arranged in the lamp compartment 10, but is displaced towards the lamp compartment 11 to such an extent that its filament is located approximately at the height of the free transverse side of the panel 30. Thus, space for a parabolic reflector 33 is provided on one side of the bulb behind the light transmitting surface 32, which parabolic reflector 33 is formed by the back 12 and a reflecting layer applied thereto. The glass 18 of the bulb 17 is surrounded by a partially spherical ball reflector 34 in its portions behind the panel 30. The ball reflector 34 is posited outside the light transmitting surface, the center of which ball reflector 34 is at least approximately identical with the filament of the bulb 17 and which ball reflector 34 casts light from the bulb 17 onto the parabolic reflector 33. This light impinges on the parabolic reflector at least approximately as if it were from the filament of the bulb 17 and therefore is diverted to the light transmitting opening 14 by the reflector 33. Thus, for the illumination of the light transmitting surface 14 light produced by the bulb in the portion behind the panel 30 also is used. Thus, the light values necessary for the fog warning lamp readily can be achieved.

The ball reflector 34 is of such a size that the entire light cast on it by the bulb 17 and reflected by it does not reach the parabolic reflector 33. In particular, the ball reflector 34 extends into the space between the bulb 17 and the front of the lamp compartment 10 approximately up the plane defined by the transverse side of the panel 30 and the imaginary point of the filament of the bulb, even if light is case from that point through the aperture 16 in the back 12. However, in this portion, designated by the reference numeral 35 in the drawing, the ball reflector acts as an additional panel which prevents light emitting from the bulb 17 from directly reaching the panel 30. Therefore, the requirements of material the thickness of this panel 30 must just be provided in such a way that it absorbs diffused light impinging on it.

In another embodiment of a lamp for motor vehicles according to the present invention, the compartment 10 is assigned to the backup lamp, and a colorless cover glass 14 is used instead of a red one.

What is claimed is:

1. A lamp installation for motor vehicles comprising, two adjacent lamp compartments one of said compartments comprising a vehicle fog or back up light, each compartment having a back and an open front end, each lamp compartment open front covered by a transparent cover, a bulb in each lamp compartment, the bulb in said one of said lamp compartments projecting into said one of said lamp compartments from one side of the back thereof adjacent the other of said lamp compartments, a parabolic reflector mounted within said one compartment along the other side from said bulb, reflecting light from said bulb to said cover, light blocking means extending across said one lamp compartment on said one side adjacent the other of said lamp compartments, said light blocking means lying within said transparent cover and partially blocking said transparent cover to define a light transmitting portion of said transparent cover on the other side of said one of said lamp compartments from said light blocking means and bulb, and wherein the side to side width of said one lamp compartment whereat said bulb is located is substantially greater than the side to side width of said light transmitting portion of said transparent cover at the front of said one of said lamp compartments.

2. The lamp installation according to claim 1 wherein said light blocking means comprises an opaque panel mounted at the front of said one lamp compartment adjacent the other lamp compartment.

3. The lamp installation according to claim 2 further including a partially spherical reflector mounted centered over said bulb in said one lamp compartment so as to reflect light from said bulb onto said parabolic reflector.

4. A lamp installation for motor vehicles comprising, two adjacent lamp compartments, each compartment having a back and an open front end, each lamp compartment open front end covered by a transparent cover, a bulb mounted means mounting in each lamp compartment, the bulb in one of said lamp compartments projecting into said one of said lamp compartments from one side of the back thereof adjacent the other of said lamp compartments, a parabolic reflector mounted within said one compartment along the other side from said bulb, reflecting light from said bulb to said cover, said bulb partly surrounded by a partially spherical reflector, said bulb approximately located at the center of said partially spherical reflector, said partially spherical reflector reflecting light from said bulb onto said parabolic reflector, an opaque panel extending across the front of said one lamp compartment on said one side adjacent the other of said lamp compartments, said panel lying within said transparent cover and partially blocking said transparent cover to define a light transmitting portion of said transparent cover on the other side of said one of said lamp compartments from said panel and bulb, and wherein the side to side width of said one lamp compartment whereat said bulb is located is substantially greater than the side to side width of said light transmitting portion of said transparent cover at the front of said one of said lamp compartments.

5. A lamp installation for motor vehicles according to claim 4, wherein said one lamp compartment comprises a fog warning lamp of said motor vehicle.

6. The lamp installation according to claim 4 wherein said one lamp compartment comprises a back up lamp of said motor vehicle.

* * * * *